United States Patent [19]

Grob et al.

[11] Patent Number: 4,722,227
[45] Date of Patent: Feb. 2, 1988

[54] HIGH PRESSURE SENSOR

[75] Inventors: Alfred Grob, Oberstenfeld; Wolfgang Leibfried, Leonberg; Karl Rampmaier, Stuttgart-Botnang; Kurt Spitzenberger, Weil der Stadt; Günther Stecher, Ludwigsburg; Klaus Steinle, Sindelfingen; Heinz Walter, Rutesheim; Herbert Zimmermann, Freiberg, all of Fed. Rep. of Germany

[73] Assignee: Robert Bosch GmbH, Stuttgart, Fed. Rep. of Germany

[21] Appl. No.: 887,133
[22] PCT Filed: Oct. 28, 1985
[86] PCT No.: PCT/DE85/00418
   § 371 Date: Apr. 22, 1986
   § 102(e) Date: Apr. 22, 1986
[87] PCT Pub. No.: WO86/02999
   PCT Pub. Date: May 22, 1986

[30] Foreign Application Priority Data

Nov. 7, 1984 [DE] Fed. Rep. of Germany ....... 3440568

[51] Int. Cl.⁴ .......................... G01L 7/08; G01L 9/06
[52] U.S. Cl. ...................................... 73/706; 73/721; 73/727; 338/4
[58] Field of Search ................. 73/754, DIG. 4, 706, 73/721, 727; 338/4, 2, 3, 5, 36; 128/675; 20/610 SG

[56] References Cited

U.S. PATENT DOCUMENTS 4,586,018  4/1986  Bettman ............................. 73/720

Primary Examiner—Donald O. Woodiel
Attorney, Agent, or Firm—Michael J. Striker

[57] ABSTRACT

The high pressure sensor includes a housing part, a lid closing the same and an intermediary disposed sensor disk. A cylindrical pressure chamber is formed in the housing, wherein an inner area of the sensor disk is disposed in a sealed off manner. In this area the measuring sensors are disposed in form of piezoresistive layer resistors. Layer conductors penetrate from this inner area into an outer area, wherein evaluation circuits and the evaluation electronic are disposed. The total sensor disk is provided with one or a plurality of glass layers in such a manner that a flat surface is obtained. Pressure changes of the pressure medium are picked up in the pressure chamber by the measuring sensors and are processed accordingly. Such a high pressure sensor is relatively simple and advantageous in its use.

5 Claims, 2 Drawing Figures

HIGH PRESSURE SENSOR

BACKGROUND OF THE INVENTION

The invention relates to a high pressure sensor in accordance with the type of the main claim. There are sensors which operate in accordance with the principle of the resistive wire strain. However, this results in many problems with respect to high pressure sensors, which in particular relate to the long time accuracy and the long time stability, fatigue of the support, the bracing, the limit layer between the resistive wire strain and the supports, fatigue of the electric contacts and others.

SUMMARY OF THE INVENTION

In contrast to conventional sensors, the high pressure sensor of the present invention is advantageous in that a piezoresistive sensor element is used which reacts directly to pressure changes of the pressure transmitting medium. Thus, the signal generating can be separated from the mechanical coupling of the sensor element to the high pressure chamber. Thus, new degrees of freedom are provided for the disposition of sensor elements and for their constructive use, which can be flexibly handled. The high pressure sensor can be easily made, assures a high life span and represents a disk with a flat surface, so that it can be installed without any problem.

One exemplified embodiment of the invention is illustrated in the drawing and explained in detail in the following description.

DETAILED DESCRIPTION OF THE PREFERRED EMBODIMENTS

Figure 1:
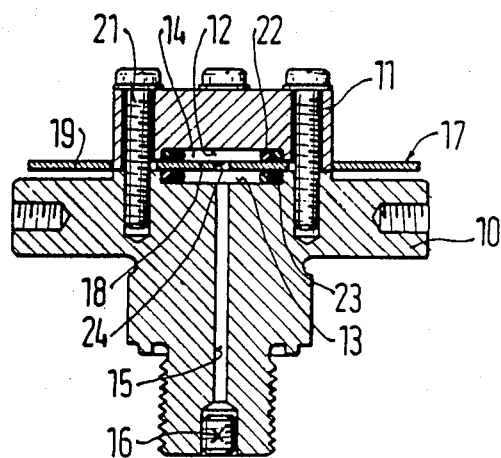
FIG. 1 illustrates a longitudinal section through a high pressure sensor.

The high pressure sensor is provided with a lower housing part 10 which is closed by a lid 11. A cylindrical chamber 12, 13 is formed on the opposite disposed front faces of the lower housing part 10 and lid 11, respectively whereby a cylindrical pressure chamber 14 is provided after assembly of the parts. From this chamber a longitudinal bore 15 extends to the outside of the housing, wherein a throttle 16 is disposed.

Figure 2:
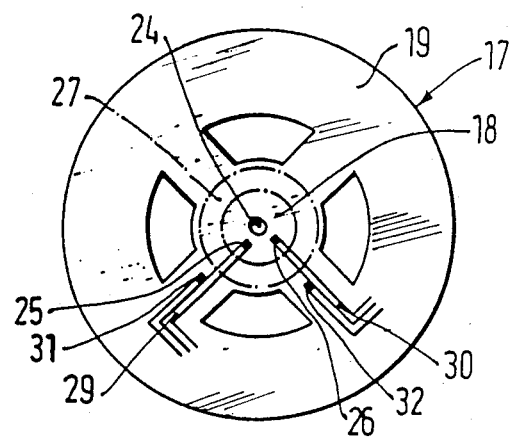
FIG. 2 illustrates a sensor disk.

A round sensor disk 17 being provided with an inner area 18, which is disposed in the pressure chamber 14, as well as an outer area 19, which is disposed outside and between lower housing part 10 and lid 11. As illustrated in FIG. 2, a plurality of apertures are formed in the sensor disk 17 through which ribs of the lid, not particularly illustrated, penetrate therethrough toward the lower housing part, as well as a plurality of mounting screws 21 with which the parts are held together. The inner area 18 of the sensor disk is sealed toward the outside by means of sealing rings 22 and 23. Disk 17 is provided with a continuous center bore 24, whereby a pressure balance is provided in the pressure chamber 14.

The sensor disk 17 is made advantageously of steel. A plurality of measuring sensors 25,26 are provided on the inner area of the disk 17 in form of piezoresistive layer resistors, as illustrated in FIG. 2. The dash-dotted intermediate area 27 of the sensor disk represents the sealing area, e.i., the area in which the sealing rings 22,23 are mounted. Layer conductors 29,30 extend from the measuring sensors 25,26 to the outer area 19 which contains the supplementary resistors 31,32 as well as evaluation circuits and evaluation electronic, connecting plug etc. for the measuring sensors. The resistors and conductors are all designed very flat and are provided with cover layers, mainly made of glasses. The glasses protect the sensor resistors and the remainder of the circuit parts from all environmental influences and generate a flat, smooth and pressure resistant surface, so that a relative simple and problemless high pressure sealing by the pressure rings 22,23. The measuring sensors 25,26 in pressure chamber 14 are encompassed by the pressure medium from all sides and react immediately to its pressure changes. In contrast to the resistive wire strain a primary deformation of the disk for signal generating is not required. The pressure chamber 14 is admitted with pressure medium through bore 15, whereby the throttle 16 is used as a dampening throttle.

With the design in accordance with the invention the signal generating can be separated from the mechanical coupling of the measuring sensor to the high pressure chamber. Thus new degrees of freedom are opened for the development and use of sensor elements and for their constructive use. The making of the sensor disk is relatively simple, cost effective, very reliable and permits the installation of miniaturized sensors on a very small space with many possible installation geometries. Also, a simple making of multiple sensors on the smallest space are made possible. Thereby, the accuracy and reliability of such sensors can still be further increased.

We claim:

1. High pressure sensor comprising a high pressure chamber admitted with high pressure liquid; sensor elements positioned in said high pressure chamber for picking up liquid pressures by a direct deformation of the sensor elements in the high pressure chamber; a disk including a first area (18) provided with said sensor elements, said sensor elements being piezoresistive layer resistors (25,26) which are sealed off in said pressure chamber (14), said disk including a second area (19) disposed on an outer side thereof and complemented with evaluation circuits and attachment devices, said sensor disk having a base body formed with said first and second area and made of steel; said piezoresistive layer resistors and evaluation circuits being mounted on said base body, said sensor further including layer conductors also mounted on said base body; said resistors, said conductors and said evaluation circuits being coated with at least one layer of glass, respectively so as to obtain a flat surface on said disk.

2. Sensor in accordance with claim 1, further including a housing (10) and a lid (11) which closes said housing, said high pressure chamber being cylindrical and being formed between said lid and said housing, said disk having a continuous bore (24) which extends through a center of the disk so as to provide a pressure balance in said chamber; and sealing rings (22,23) disposed at an edge of the pressure chamber at both opposite sides of the disk.

3. Sensor in accordance with claim 1, wherein said disk is provided with a plurality of slots concentrically extending in a center range thereof, said lid including ribs and screws (20) which penetrate through said slots.

4. Sensor in accordance with claim 1, wherein said housing has a longitudinal bore (15) which penetrates into the pressure chamber (14), and a throttle (16) is provided in said longitudinal bore.

5. Sensor in accordance with claim 1, wherein a plurality of sensor disks (17) may be disposed parallel with respect to each other.

* * * * *